United States Patent [19]

Mecklenborg

[11] 4,112,462
[45] Sep. 5, 1978

[54] INFINITY IMAGE DISPLAY HAVING INCREASED VERTICAL FIELD OF VIEW

[75] Inventor: Richard A. Mecklenborg, Binghamton, N.Y.

[73] Assignee: The Singer Company, Binghamton, N.Y.

[21] Appl. No.: 745,004

[22] Filed: Nov. 26, 1976

[51] Int. Cl.² ............................................. H04N 7/18
[52] U.S. Cl. ................................. 358/104; 358/250
[58] Field of Search ............. 358/104, 230, 231, 237, 358/238, 239, 248, 249, 250; 35/12 N

[56] References Cited

U.S. PATENT DOCUMENTS 3,785,715  1/1974  Mecklenborg ...................... 358/104

Primary Examiner—Richard Murray
Attorney, Agent, or Firm—Jeffrey Rothenberg

[57] ABSTRACT

The vertical field of view of a standard spherical mirror-beamsplitter infinity image display is increased by skewing the display with respect to an observer. The display is skewed so that the center of curvature of the display mirror is shifted laterally and rearwardly relative to the observer's eyepoint. To maintain the displayed image in proper alignment, the input image to the display is also displaced.

23 Claims, 13 Drawing Figures

INFINITY IMAGE DISPLAY HAVING INCREASED VERTICAL FIELD OF VIEW

BACKGROUND OF THE INVENTION

1. Field of the Invention

This invention relates to visual displays in general and more particularly to an improved infinity image display for use with vehicle simulators.

2. Description of the Prior Art

As the cost of training in actual vehicles, such as modern commercial and military aircraft, large ships, trucks, etc., has risen, there has been an increased demand for better simulators and trainers in which training can be done at a much lower cost. One way of improving simulation fidelity and the training value of such devices, is to include therein a display system which can provide the trainee with realistic visual cues. Ideally, such a visual display should provide an image that appears to be at infinity, over as large a field of view as is visible from the actual vehicle.

One of the best ways of developing an image at infinity is to use a spherical mirror as a collimator. In a well known simulator display system of this genre, a beamsplitter and spherical mirror are located in front of a trainee. The beamsplitter is used to fold the optical axis so that an input image source can be located out of the direct field of view of the trainee, at an elevated position optically equivalent to the focal surface of the spherical mirror. The input image is projected from said source down onto the beamsplitter, from which it is reflected forward onto the concave surface of the spherical mirror. The visual scene is then reflected back from the mirror, through the beamsplitter, to the trainee's eye, which is located on the optical axis of the display, near the center of curvature of the mirror.

Although any one of a number of available image generators can be employed with the above-described infinity image display, frequently a cathode ray tube (CRT), having its faceplate located in the focal plane of the spherical mirror, is used as the image source for the display. This CRT-mirror-beamsplitter combination is widely used in vehicle simulators, especially flight simulators, to provide realistic out-of-the-window scenes.

The primary deficiency of the CRT-mirror-beamsplitter display is that it provides only a limited vertical field of view. The CRT limits the top of the field of view and the intersection of the beamsplitter and the mirror, the bottom. The vertical field of view of the existing display is thus constrained to approximately 28°.

To enlarge the vertical field of view presented by such a CRT-mirror-beamsplitter display, the prior art has resorted to aerial images and tiered display systems. See, for example, U.S. Pat. Nos. 3,432,219; 3,709,581; and 3,659,920. The aerial image systems provide increased vertical field of view, but only with attendant increases in complexity, cost, size and light loss. The tiered systems suffer from similar disadvantages and are also plagued by alignment and maintenance problems.

In U.S. Pat. No. 3,785,715, it is suggested that the vertical field of view of a flight simulator infinity image display could be increased by moving the observer's eyepoint inside the center of curvature of the mirror. In practice, the interior configuration, of simulated cockpits makes such repositioning of the trainee impossible. This earlier patent also suggests that the display could be scaled larger than normal to displace rearwardly the center of curvature of the spherical mirror. This would, of course, result in an undesirable increase in display weight and size. Moreover, it should be noted that it is presently impossible to scale-up a display using a color CRT, since the largest available color CRT has only a 26" diagonal.

Thus there exists a need for a method and apparatus for increasing the vertical field of view from a standard mirror-beamsplitter infinity image display, without materially increasing the size, expense or complexity of the display, without requiring corrective lenses or tedious alignment procedures, and without deteriorating the quality of the final image provided by the display.

SUMMARY OF THE INVENTION

The present invention provides a surprisingly simple, yet elegant, solution to this problem. According to the instant invention, the field of view from a standard mirror-beamsplitter infinity image display is markedly increased by skewing the display with respect to an observer and reorienting the input image to compensate for said skewing. Where the input image is provided by a CRT, it can be reoriented electronically, optically or mechanically (i.e., by physically displacing the tube). Optionally, the reflectivity of the beamsplitter can be increased or a circular polarizer added to the display, to reduce ghost imaging of cabin lights.

A principal object of this invention is therefore, to provide an improved infinity image visual display system.

Another object is to provide a method and apparatus for increasing the field of view from a standard mirror-beamsplitter display without materially increasing the cost, size, complexity or light loss of said display.

Still another object is to provide an off-axis infinity image display capable of providing a high quality image over a wide field of view.

Yet another object of the invention is to provide a simple, compact, lightweight, versatile infinity image display compatible with a wide variety of input image sources and particularly well suited for use in vehicle simulators.

A further object of the invention is to provide a improved wide angle collimating display system especially well suited for increasing the outboard vertical field of view of a trainee in a flight simulator.

A still further object is to provide an infinity image display which permits full utilization of the available downfield of a flight simulator cockpit.

Other objects and advantages of the invention will in part be obvious and will in part appear hereinafter.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION

Figure 1A:
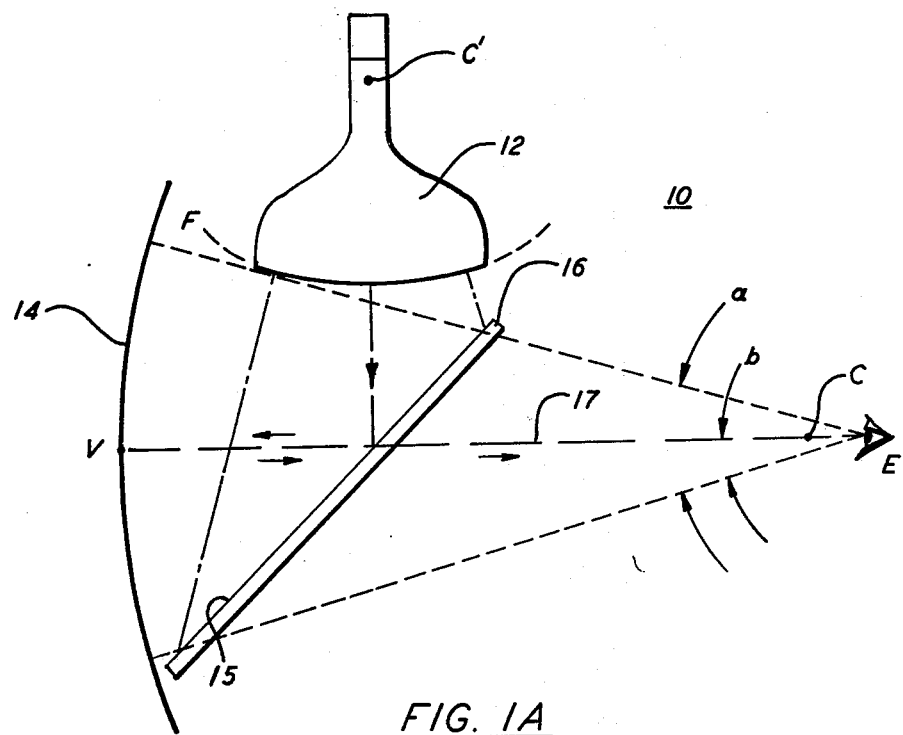
FIG. 1A is a side view of a standard CRT-mirror-beamsplitter infinity image display.

A prior art infinity image display 10 is illustrated in FIG. 1A. The design of this display is quite simple, consisting of only three primary elements; a large screen cathode ray tube (CRT) 12 which acts as an image source, a spherical mirror 14 which serves as a collimating optical element, and a beamsplitter 16 which folds the optical path. To provide a collimated image to an observer at eyepoint E, the CRT faceplate is located at the focal surface F of the spherical mirror. The display is arranged so that the observer's eyepoint is located on the axis 17, (hereinafter referred to as the optical axis of the display) which extends between the vertex V and the center of curvature C of spherical mirror 14. Eyepoint E is generally located as near as possible to center of curvature C.

In operation, the image presented on the faceplate of CRT 12 is projected down onto the partially reflective-partially transmissive front surface 15 of beamsplitter 16. This front surface reflects the image forward to spherical mirror 14, where it is collimated and reflected back, through beamsplitter 16, to the observer. In this manner, the CRT input image is made to appear at infinity to the observer.

The components of this standard infinity image display are all commercially available items. Spherical mirror 14 preferably has a highly reflective concave surface. The beamsplitter may utilize a dielectric reflective coating for maximum reflectane/transmission efficiency on its front surface, and a high efficiency anti-reflective coating on its back surface. The high efficiency of the front surface provides for maximum brightness from the display, and the anti-reflective coating reduces ghosts or secondary images from the CRT that might otherwise be evident in the displayed image. The CRT typically comprises a commercially-available color TV monitor which utilizes commercially available components throughout.

It should be noted that this known display utilizes no refracting elements — i.e., it has no lenses. Instead, all of the optical elements are of the reflecting type which exhibit non-selective spectral characteristics. The display is thus ideally suited for color or black and white presentations because it introduces no color fringing in the final image.

This freedom from chromatic aberrations and the inherent simplicity of the above-described display have made it a favorite for use in vehicle simulators. Unfortunately, this widely used display is also characterized by a restricted vertical field of view.

As illustrated in FIG. 1A, the top of the vertical field of view "$a$" is restricted by the CRT, while the bottom of the field is limited by the interception of the beamsplitter and spherical reflector. These physical boundaries generally limit the vertical field of view to approximately 28° and the down angle "$b$" to only 14°.

Figure 1B:
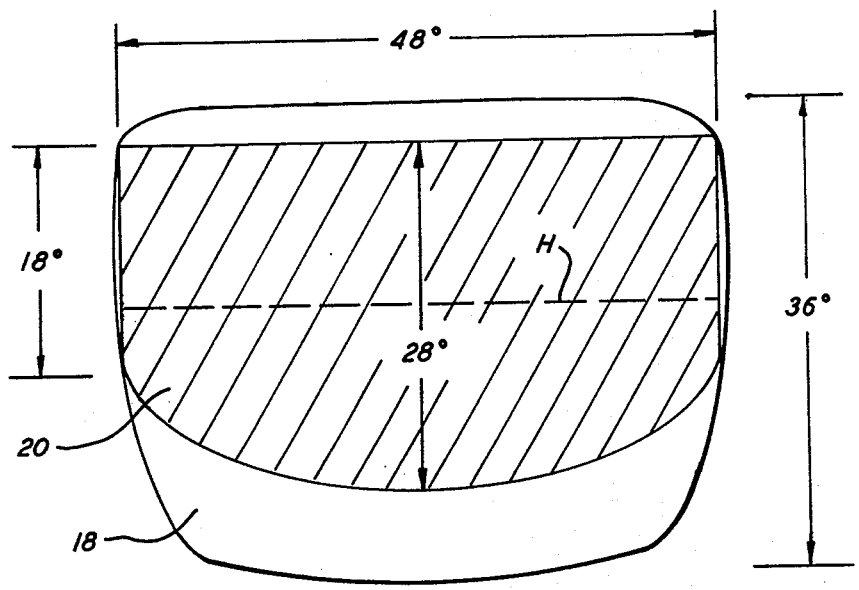
FIG. 1B is a sketch illustrating the field of view of the standard CRT-mirror-beamsplitter display superimposed upon the available CRT image.

FIG. 1B illustrates the truncating effect of these physical constraints upon the nominally available CRT image 18. Although the horizontal field of view of final image 20, is roughly coextensive with the available CRT image, the vertical field of view is markedly diminished. As depicted, the vertical field of view ranges from a high of about 80% of the available CRT image, to only about 50% at the outer ends. Furthermore, it should be noted that it is the down (i.e., that portion below horizon line H) which is most severely restricted. Unfortunately, in many simulators, especially flight simulators, it is the information in the down field which is most significant for training purposes.

Figure 2:
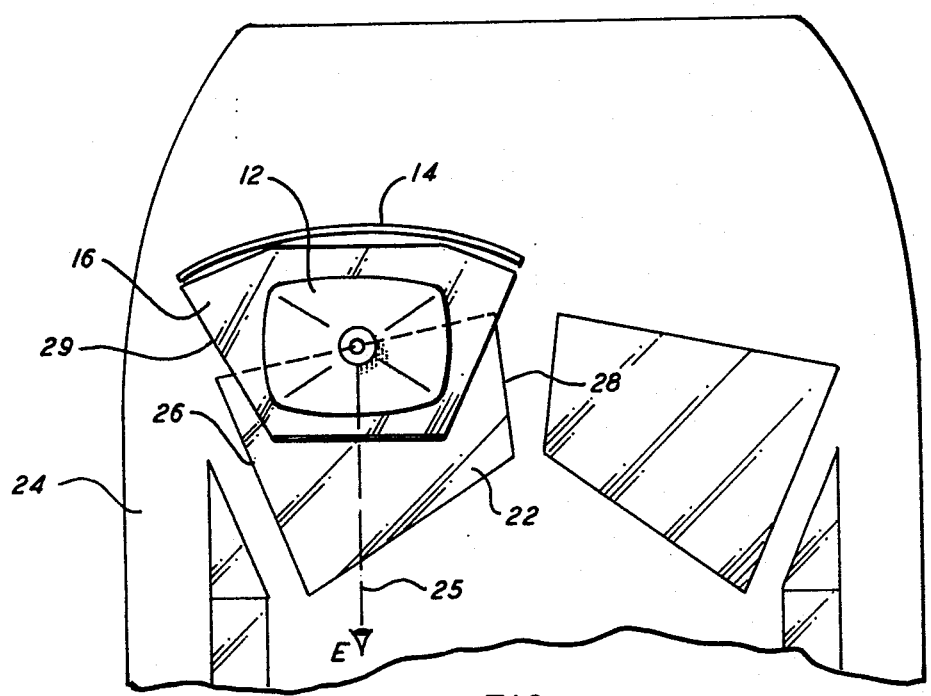
FIG. 2 is a plan view of a flight simulator cockpit with a conventional infinity image display.

FIG. 2 illustrates, in plan view, a typical arrangement of the above-described infinity image display in a flight simulator. As shown, the display unit is mounted in front of a windshield 22 of the simulator cockpit 24. CRT 12 is located forward and above the slanting windshield 22, with the neck of the tube extending vertically. Vertical mirror 14 and sloped beamsplitter 16 are arranged so that the optical axis of the display coincides with the forward line of sight 25 from an observer's eyepoint E. Typcially, one such on-axis display system is provided for each forward aircraft window so that a realistic infinity image can be presented to each crew member.

In the standard display configuration of FIG. 2, a large amount of space exists between the display unit and the outer edge 26 of the windowsill 28. According to the instant invention, this space can be used to significantly increase the outboard downfield of view.

Figure 3:
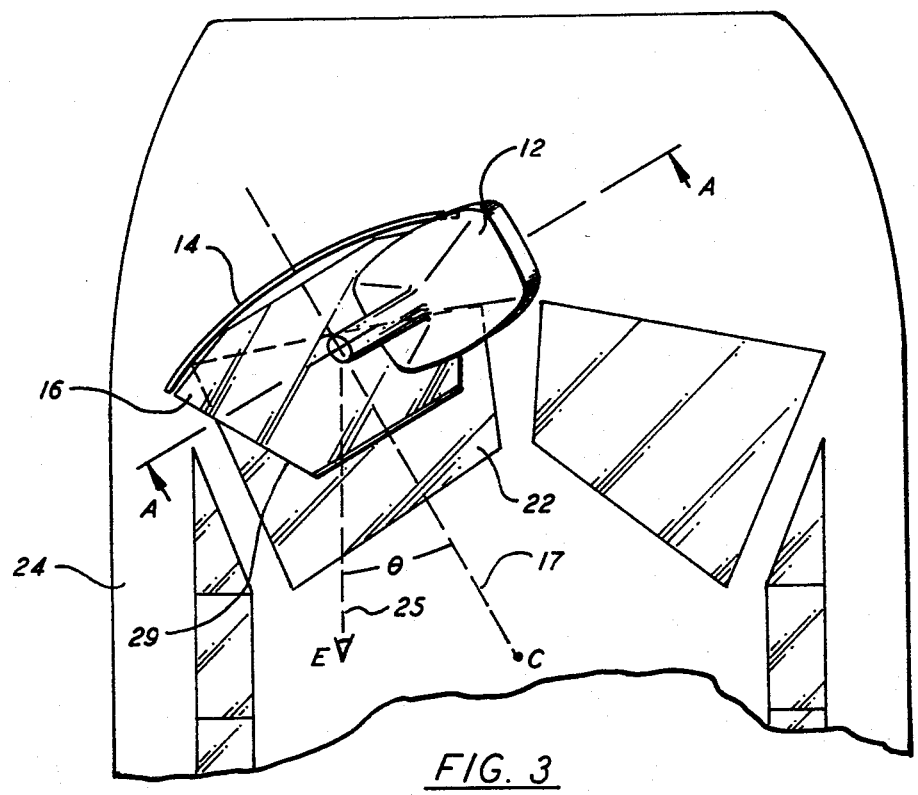
FIG. 3 is a plan view of a flight simulator cockpit with the improved infinity image display of the current invention mounted thereon.

This expanded outboard vertical field is achieved by rotating the display about its inboard vertical edge. This brings the outboard edge 29 of the display closer to the pilot and at the same time increases his vertical field of view. The desired skewing of the display relative to the observer is illustrated in plan view in FIG. 3. Although the amount of rotation of the display is dependent upon the cockpit's external configuration and the field of view requirements, the skew angle $\theta$ (i.e., the angle between the forward line of sight 25 and the optical axis 17 of the display) is typically on the order of 10°.

Figure 4:
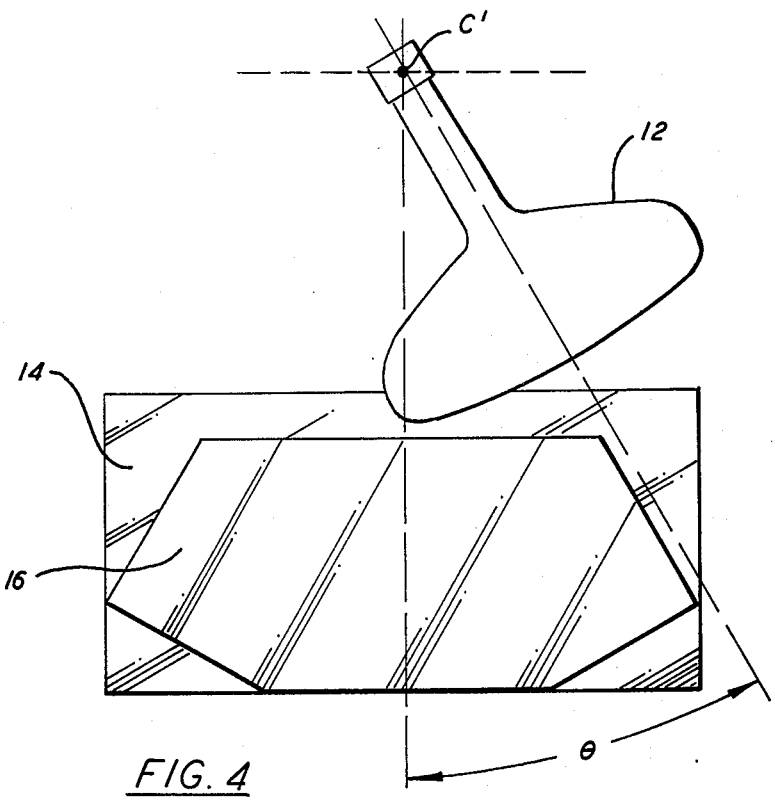
FIG. 4 is a sectional view of the display of the instant invention.

Rotation of the display causes the input image to be rotated as well. This appears to the observer as a displacement from center of the forward point of the displayed image. The correct this "heading" error and realign the image forward point with the observer's forward view, the CRT image must be reoriented. This can be done by eletronically, optically or physically displacing the CRT image. As shown in the sectional view of FIG. 4 (taken along lines A—A in FIG. 3), the CRT is, preferably, rotated, about a reflected center of curvature C', through an angle $\theta$ equal to the skew angle of the display system. Note that the CRT is rotated about an axis parallel to the optical axis of the skewed display.

FIG. 5 illustrates the steps taken to skew the display and correct the image position, and the effect of these steps upon the pilot's field of view as seen through the cockpit window. FIG. 5A schematically shows the standard arrangement of mirror 14, beamsplitter 16, a virtual CRT 12' and an on-axis eyepoint E, ideally located at the center of curvature of the mirror. The clipped image 20 presented to the pilot by this standard display system is illustrated in FIG. 5B.

Figure 5A:
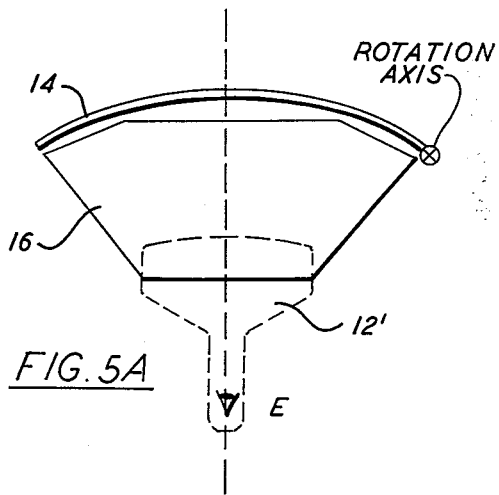
FIGS. 5A – 5F are simplified display schematics and window views useful in understanding the instant invention.
Figure 5B:
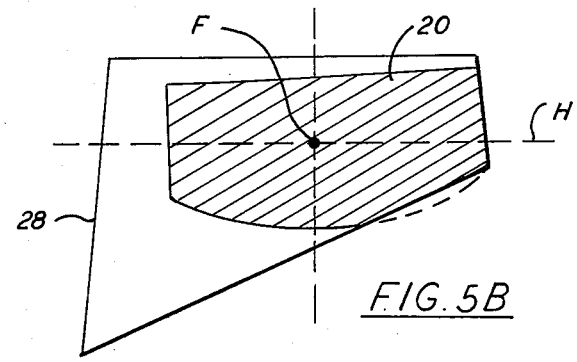
Figure 5C:
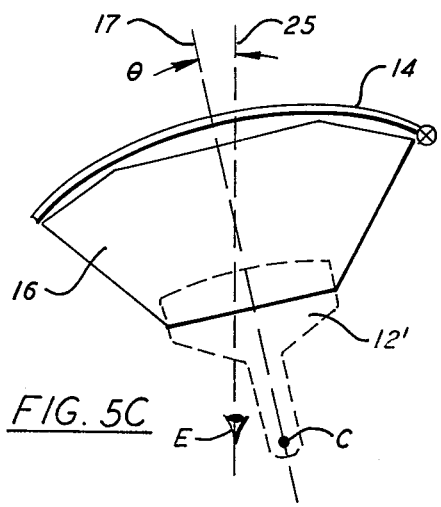
Figure 5D:
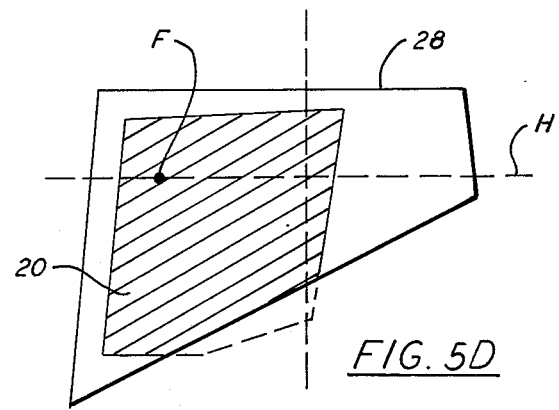

If the display is rotated about the inboard vertical edge of mirror 14, as shown in FIG. 5C, the optical axis 17 of the display is angled with respect to the forward line of sight 25 and the center of curvature C of mirror 14 is shifted laterally and rearwardly with respect to eyepoint E. This results in an increase in the downfield of view as shown in FIG. 5D. However, the display rotation will also rotate the image and the forward point F of the displayed image will appear to the left of the correct forward position.

Figure 5E:
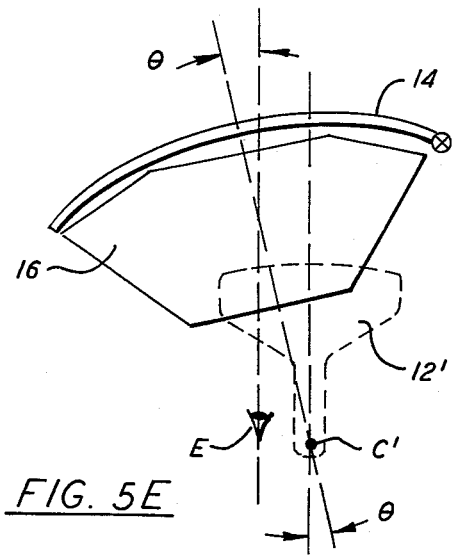
Figure 5F:
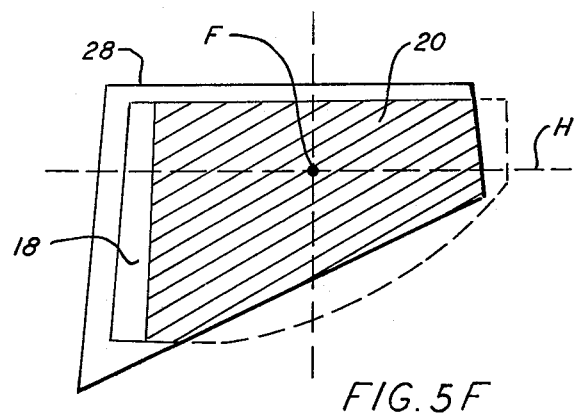

Rotation of the CRT about the reflected center of curvature of the mirror C', through an angle equal tto the skew angle of the display, is schematically illustrated in FIG. 5E. This will return the forward point of the image to a position directly ahead of the observer (See FIG. 5F). Cumulatively these steps effectively shift the eyepont off axis and forward relative to the center of curvature of the mirror and correct the image position. As a comparison of FIG. 5F with FIG. 5B illustrates, this results in a dramatic increase in the outboard vertical field of view.

The quality of the final image provided by the above-described improved display will in most cases be quite acceptable. Any distortion or aberration of the final image can be corrected, in well-known fashion, by electronically adjusting the CRT image or by computer optimization of the mirror radius and inter-component spacings. However, it is expected that in most cases such corrections will not be necessary.

Figure 6:
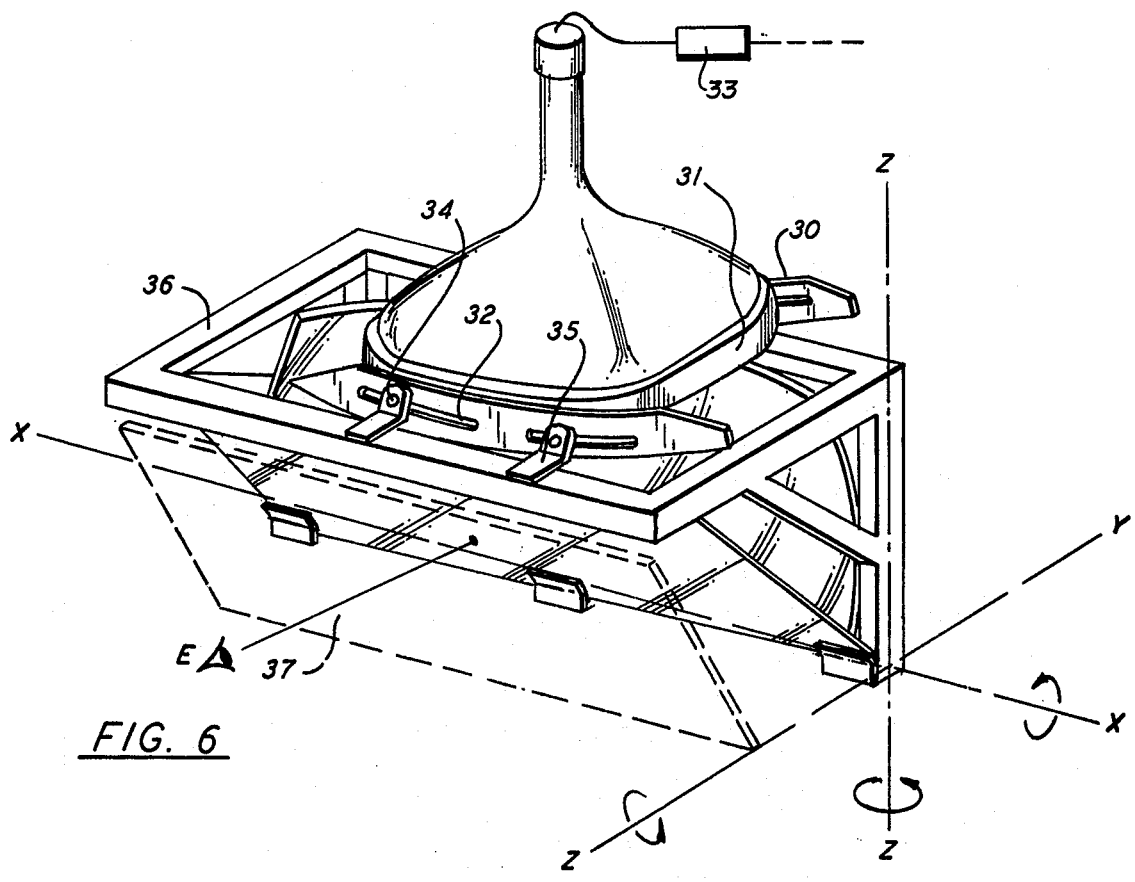
FIG. 6 is a front perspective view illustrating preferred display mounting means and various rotational axes of the instant invention.

It should be noted that in most applications of the instant invention, neither the size nor the make-up of the standard display changes. The display is simply mounted in a skewed relationship on a conventional support framework. To permit the CRT to rotate, only a new mounting bracket for the CRT is needed. A suitable "rocking chair" coupling for mounting the CRT in the display unit is illustrated in FIG. 6. The coupling consists of a set of parallel arcuate plates 30 attached to a CRT supporting bezel 31. The plates contain arcuate slots 32 for slideably receiving bolts 34, connected via angle irons 35 to the display supporting framework 36. This mounting arrangement permits the CRT to be rotated about the reflected center of curvature. Of course, alternative mounting means which permit universal or bidirectional rotation of the image source may be employed. Instead of physically rotating the CRT, the input image on the CRT faceplate can be electronically reoriented by a raster computer or other conventional signal processing means 33.

In certain situations, the skewed display of the instant invention may produce spurious reflections of cockpit night lights. If these ghost images prove too distracting, they can be reduced by either increasing the reflectivity of the beamsplitter or interposing a circular polarizer 37 between the beamsplitter and observer. Such measures are, however, unnecessary in many applications, e.g., simulation of daylight flying, helicopter operation, etc. Ambient light is excluded from the skewed display in conventional fashion, i.e., by enclosing the display within a light-tight shroud (not shown).

So far, this description has only been concerned with rotation of the display 10 about a vertical axis. In certain cases, it may be desirable to alternatively or additionally rotate the display about other axes, such as those illustrated in FIG. 6. For example, rotation about axis y—y could be used to increase the outboard down field and would require that the CRT image be rolled, electronically, optically or physically, about an axis extending along the neck of the CRT.

Rotation of the display about a horizontal axis x—x might be used to increase the downfield of view at the expense of the upfield, i.e., to raise the horizon line of the image, without altering the total vertical field of view. This is particularly useful for helicopter visual systems. In this case, compensatory rotation of the CRT image would occur about an axis parallel to axis x—x.

The above variations will permit the full utilization of the available downfield on most cockpits.

Note further that if the display 10 is first rotated 90° about its optical axis, so that the neck of the CRT extends horizontally, and is then skewed, as described earlier, the instant invention can be used to expand the horizontal field of view of the display. In general, the direction of field of view expansiion will be along the same axis as CRT neck extension.

Figure 7:
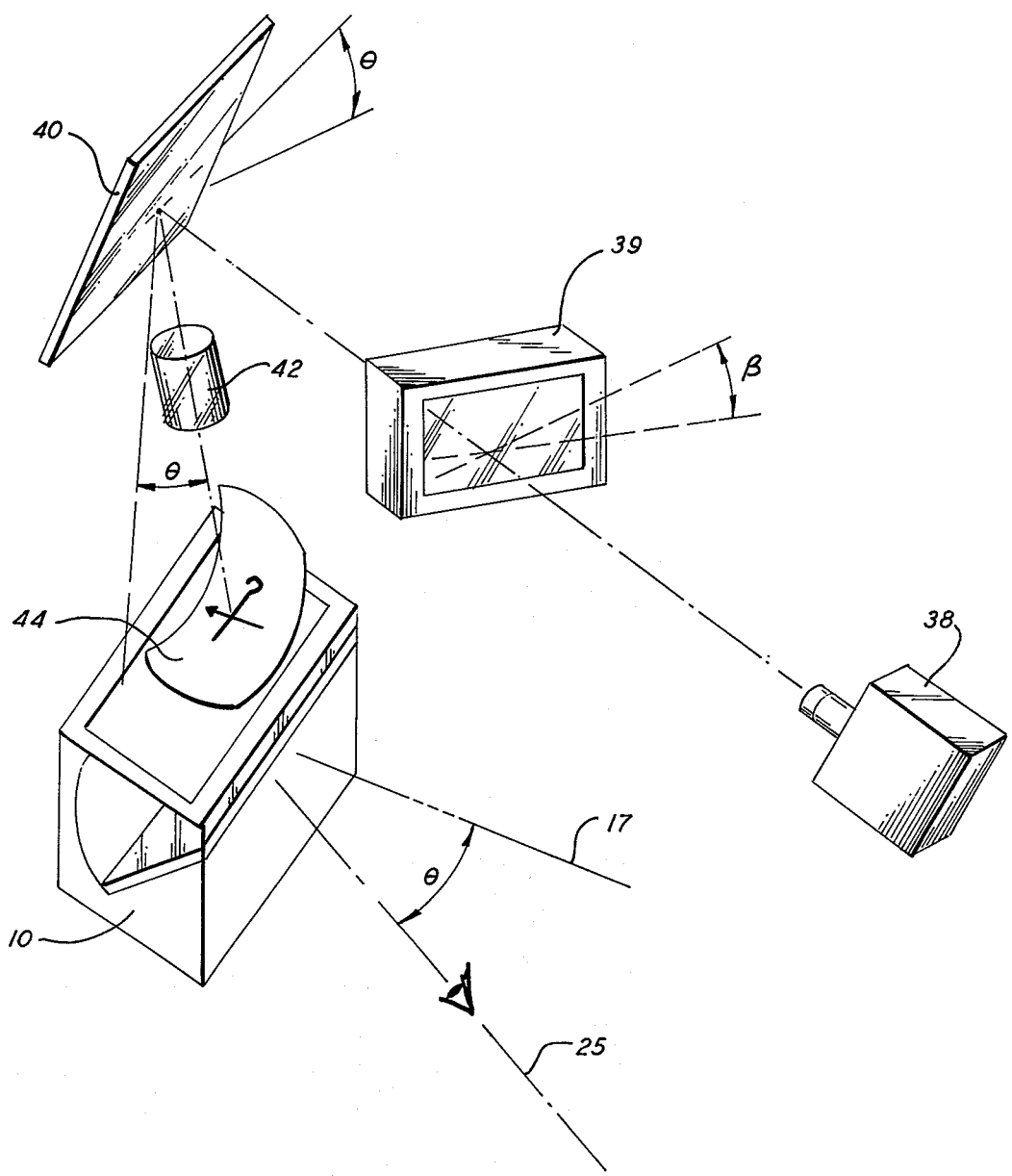
FIG. 7 is a perspective view of the display unit of the instant invention in conjunction with a film projection image source.

FIG. 7 illustrates implementation of the current invention with a film projection system. In this case the input image for th infinity image display 10 is provided by an image source comprising a projector 38, field lens 39, plane mirror 40, reimaging lens 42, and a screen 44 integral with the display. As shown, the display is skewed by rotating it about a vertical axis, and correct image position is attained by rotating the screen, reimaging lens and planar reflector through an angle equal to the skew angle of the display. Note also that the field lens 39 is rotated through an angle $\beta$ to provide added downfield at upfield expense. Typically, the skew angle might equal 12° with $\beta$ equal to about 7°. Alternatively the field lens, which acts as a stop, can simply be made larger.

According to the instant invention, with only minor modifications to the orientation of the display and input image, the outboard vertical field of view from a simulator cockpit window, can practically be doubled. Thus a surprisingly simple, but ingenius, scheme for significantly increasing the vertical field of view of a mirror-beamsplitter infinity image display has been shown.

Although particular mention has been made of the use of such a display in aircraft simulators, it is equally applicable wherever an infinity image display is required. It also is obvious that various modifications may be made to the disclosed embodiments without departing from the principles of the invention. For instance, the spherical mirror can be located to reflect light which has been initially transmitted by, rather than reflected from, the beamsplitter. Instead of a spherical mirror, a Mangin mirror, parabolic mirror or other collimating reflex reflector may be employed. Similarly, the beamsplitter may be replaced by other partially reflective-partially transmissive structures. Instead of mounting the CRT with a rotatable coupling, it can be fixedly mounted at the desired compensatory angle. Likewise, rather than mechanically rotating the CRT, the input image can be electronically reoriented on the CRT faceplate or optically adjusted, in the display or image generator optics.

In addition to CRT's and film projection systems, other image sources, including aerial image sources, may be used with the instant invention. The display of the current invention could, of course, also be tiered or mosaiced to further widen the field of view. Other possible modifications, variations and applications will suggest themselves to those of ordinary skill in the art.

What I claim is:

1. A method for increasing the field of view of a displayed image provided by an image source-spherical mirror-beamsplitter display to an observer whose eyepoint is normally located near the center of curvature of said mirror, said display being operable to transform an input image from the image source into a displayed image that appears to be at infinity to said observer, comprising the steps of:

shifting the mirror's center of curvature laterally and rearwardly with respect to the observer's eyepoint; and displacing the input image to correct any heading error of the displayed image produced by the shifting step.

2. The method of claim 1 wherein said shifting step comprises skewing the display with respect to a forward line of sight from the observer's eyepoint so that the center of curvature of the mirror is located at a point laterally offset from said line of sight and rearwardly of the observer's eyepoint.

3. The method of claim 2 wherein said displacing step comprises displacing the input image to align a forward point of the displayed image with the forward line of sight from the observer's eyepoint.

4. The method of claim 3 wherein said displacing step comprises rotating the input image through an angle equal to the angle through which the display is skewed.

5. The method of claim 4 wherein said input image is rotated electronically.

6. The method of claim 4 wherein said input image is rotated by physically rotating the image source.

7. The method of claim 4 wherein said input image is rotated optically.

8. The method of claim 4 further including the step of interposing a circular polarizer between the beamsplitter and the observer to reduce ghost images.

9. The method of claim 4 further including the step of increasing the reflectivity of the beam splitter to reduce ghost images.

10. A method for increasing the outboard downfield of view of an infinity image provided by a CRT-spherical mirror-beamsplitter display to a trainee in a flight simulator, said display normally being positioned so that its optical axis coincides with the forward line of sight from the trainee's eyepoint, comprising the steps of:

rotating the display about an inboard vertical edge of the mirror to bring the outboard edge of the display closer to the trainee; and rotating the CRT about an axis which is parallel to the optical axis of the rotated display and intersects a reflected center of curvature of the mirror, to locate a forward point of said infinity image in a position where it appears to be directly in front of said trainee.

11. The method of claim 10 wherein the display and CRT are rotated through equal angles.

12. In an infinity image display system having a display including, in optical sequence, first means for supplying an input image, second means for partially reflecting and partially transmitting incident light, and third curved reflective means for collimating said image and reflecting it back, as an infinity image, via said second means, to an observer, the improvement comprising:

fourth means for supporting said display in a skewed position with respect to a forward line of sight from the observer's eyepoint such that the center of curvature of said curved reflective means is located in back of the observer's eyepoint and laterally offset from said forward line of sight; and fifth means for orienting the input image to align a forward point of the infinity image with said forward line of sight, whereby the field of view of the infinity image is increased.

13. The improved display of claim 12 wherein said display has an optical axis extending between the vertex and center of curvature of said spherical mirror, said first means comprises a CRT, and said fifth means comprises means for supporting said CRT such that its neck extends along an axis oriented, relative to a vertical axis, at an angle equal to the angle formed between the optical axis of the skewed display and the forward line of sight from the observer's eyepoint.

14. The improved display of claim 13 wherein said second means comprises a beamsplitter, said third means comprises a spherical mirror and said fourth means comprises a supporting framework.

15. The improved display of claim 14 wherein said fourth means supports the display so that the outboard vertical edge of the display is closer to the observer than the inboard vertical edge, whereby the vertical field of view of the infinity image is increased.

16. The improved display of claim 12 wherein said third means comprises a spherical mirror, said first means comprises a CRT, and said fifth means comprises means for supporting said CRT for rotation about a reflected center of curvature of said mirror.

17. The improved display of claim 16 wherein said fifth means comprises slotted arcuate plate means coupling said CRT to said fourth means.

18. The improved display of claim 12 wherein said first means comprises a CRT and said fifth means comprises electronic means for displacing the image presented on the faceplate of said CRT.

19. The improved display of claim 12 wherein said fifth means comprises means for optically rotating the input image.

20. The improved display of claim 12 further including a circular polarizer located between said second means and said observer.

21. The improved display of claim 12 wherein said first means comprises a screen of a film projection system.

22. The improved display of claim 21 wherein said film projection system further includes a planar mirror and reimaging lens, said fifth means comprising means for jointly rotating said planar mirror, reimaging lens and screen.

23. Apparatus for displaying an infinity image over a large vertical field of view, comprising: first means for providing an imput image; beamsplitter means for reflecting and redirecting said image along an optical axis; spherical mirror means for receiving said redirected image, collimating said image and reflecting it back, as an infinity image, along said optical axis and through said beamsplitter means to an observer; wherein said optical axis does not intersect the observer's eyepoint and said input image is oriented such that the forward point of the infinity image intersects a forward line of sight from the observer's eyepoint.

* * * * *

UNITED STATES PATENT AND TRADEMARK OFFICE
CERTIFICATE OF CORRECTION

PATENT NO. : 4,112,462

DATED : September 5, 1978

INVENTOR(S) : Richard A. Mecklenborg

It is certified that error appears in the above-identified patent and that said Letters Patent are hereby corrected as shown below:

Col. 2, line 44, "a" should be --an--.

Col. 4, line 46 "The" should be --To--.

Col. 6, line 17 "th" should be --the--.

Signed and Sealed this

Fifth Day of June 1979

[SEAL]

Attest:

RUTH C. MASON
Attesting Officer

DONALD W. BANNER
Commissioner of Patents and Trademarks